United States Patent [19]

Hobbs et al.

[11] 4,124,499

[45] Nov. 7, 1978

[54] SEWAGE TREATMENT SYSTEM

[75] Inventors: Millice F. Hobbs, Monte Sereno; Arthur C. Green, Felton, both of Calif.

[73] Assignee: FMC Corporation, San Jose, Calif.

[21] Appl. No.: 766,105

[22] Filed: Feb. 4, 1977

Related U.S. Application Data

[63] Continuation of Ser. No. 655,032, Feb. 3, 1976, abandoned, which is a continuation of Ser. No. 446,938, Feb. 28, 1974, abandoned, which is a continuation of Ser. No. 255,685, May 28, 1972, abandoned, which is a continuation-in-part of Ser. No. 187,617, Oct. 8, 1971, abandoned.

[51] Int. Cl.$^2$ ............................................. C02C 1/40
[52] U.S. Cl. ..................................... 210/28; 210/51; 210/62; 210/75
[58] Field of Search ..................... 210/27–29, 210/50, 52, 53, 60, 62, 75, 18, 42 R, 46, 49, 193, 205, 206, 51, 79, 80

[56] References Cited

U.S. PATENT DOCUMENTS

| | | | |
|---|---|---|---|
| 1,993,761 | 3/1935 | Tipping | 210/28 |
| 2,628,165 | 2/1953 | Bliss | 210/29 |
| 2,709,680 | 5/1955 | Watson | 210/2 |
| 2,988,221 | 6/1961 | Culp | 210/62 |
| 3,080,315 | 3/1963 | Silvey | 210/62 |
| 3,227,650 | 1/1966 | Bell | 210/75 |
| 3,252,899 | 5/1966 | Rice et al. | 210/193 |
| 3,317,047 | 5/1967 | Hansen | 210/139 |
| 3,337,454 | 8/1967 | Gruenwald | 210/62 |
| 3,401,115 | 9/1968 | Meyer et al. | 210/62 |
| 3,446,356 | 5/1969 | May | 210/117 |
| 3,472,390 | 10/1969 | Pall et al. | 210/62 |
| 3,474,033 | 10/1969 | Stout et al. | 210/50 |
| 3,480,543 | 11/1969 | Hildebrand | 210/62 |
| 3,546,713 | 12/1970 | Gagne | 4/10 |
| 3,562,154 | 2/1971 | Davis et al. | 210/36 |
| 3,577,341 | 5/1971 | Keith et al. | 210/60 |
| 3,883,432 | 5/1975 | Hildebrand | 210/206 |

FOREIGN PATENT DOCUMENTS

| | | |
|---|---|---|
| 7,210,789 | 2/1973 | Netherlands. |
| 1,183,225 | 3/1970 | United Kingdom. |

*Primary Examiner*—Thomas G. Wyse
*Attorney, Agent, or Firm*—F. W. Anderson

[57] ABSTRACT

A method is provided for rapidly producing a treated waste mixture separable into a disposable mass of solids and a hygenic effluent of relatively low coliform count. The method of treating aqueous mediums involves steps wherein a mixture of aqueous medium and four chemical additives, plus, if desired, a pH control agent, are established as a mixture in a holding zone, the solids of the mixture having a particle size resulting from recirculation between the holding zone and a zone adapted to effect coarse disintegration of any solids exceeding a predetermined size, passing the mixture thru an airtight liquid flow system under conditions to maintain solids in suspension and then separating the liquid portion thereof from the solids associated therewith for disposal as a hygenic effluent.

26 Claims, 6 Drawing Figures

SEWAGE TREATMENT SYSTEM

This application is a continuation of application Ser. No. 655,032, filed Feb. 3, 1976, now abandoned, which is a continuation of application Ser. No. 446,938, filed Feb. 28, 1974, now abandoned, which is a continuation of application Ser. No. 255,685, filed May 28, 1972, now abandoned, which is a continuation-in-part of application Ser. No. 187,617. entitled "Waste Treatment System", filed Oct. 8, 1971, and now abandoned.

This invention relates to a process for the treatment of heavily contaminated aqueous mediums such as strong sewage for the removal of organic as well as inorganic impurities therefrom. More particularly, it relates to a method specially adapted for use in disposal of sewage in which the BOD (Biochemical Oxygen Demand) and the suspended solids content is reduced and the end products are disinfected. Still more particularly, it relates to a waste disposal system specially adapted for use in disposal of sewage emanating from sources for example, such as marine galleys and toilets to produce an effluent water whose quality is equal or superior to municipal sewage treatment systems.

The waste disposal system is unaffected by and removes petroleum products and oils and greases that are derived from food preparations. In addition, phosphorus containing materials are nearly completely removed from effluent water by the waste disposal system. However, seawater salts from recirculating type toilets are not affected by said system. Zinc sulfate salts present as bacteriostatic agents in liquids from recirculating type toilets may or may not be affected by said sytem depending upon the type of pH control additive utilized. Effluents containing salts which were not affected by the system can be recycled to the recirculating toilet systems. The additives other than the pH control additives, when added to substantially neutral aqueous mediums, created a mixture which has a pH lowered from that of the influent aqueous medium, i.e., is reduced to a slightly acidic state. When the mixture is maintained at an acidic pH range of, for example, 2 to 6.0. the specified amounts of the various halogen containing bactericidal agents give rise to superior bactericidal activity. When the mixture is maintained at an alkaline pH, larger amounts of the various halogen containing bactericidal agents are necessary to obtain comparable bactericidal activity. The system containing the various additives has the novel characteristic of not being affected by the pitch and roll encountered when the apparatus is mounted in marine vessels.

The problem of water pollution has given rise to strict specifications with regard to wastes that can be discharged into bodies of water. Vessels traveling in coastal zones and on rivers and lakes must treat sewage to drastically reduce the suspended solids and to produce effluent of low suspended solids content and to disinfect it to a low bacterial count, i.e., less than about 240 coliforms per 100 ml. of water.

To treat marine wastewaters, for example, sewage emanating from marine toilets and marine holding tanks, by conventional means, such as an activated sludge process, requires expensive sewage treatment equipment which takes up a large amount of space. Such treatment systems which generally are slow in start up, and involve an aeration zone, sedimentation zone and a digestion zone, are too large for many types of vessels, and the efficiency thereof is detrimentally affected by the pitch and roll of the vessel.

Briefly the present invention comprises a process for treatment of aqueous mediums and rapidly producing a disposable mass of solids and a hygenic effluent of relatively low BOD, low suspended solids, and low phosphorus content which comprises the steps of establishing a mixture of sewage with four additives, said sewage having the solids present therein of a particle size resulting from flow through a zone adapted to effect coarse disintegration of any solids exceeding a predetermined size, said additives being a bactericidal agent. a colloidal solids coagulating agent, a filter aid and an adsorbent, passing the mixture thru a liquid and airtight liquid flow system under conditions to effect an intimate mixing of additives and to maintain solids in suspension and then separating the liquid portion of said suspension from the solids associated therewith for discharge as a substantially solids free effluent.

The pH of the mixture of contaminated aqeuous medium and additives can be controlled by incorporation of a fifth additive, in the form of a pH control agent of a type which will increase the acidity and lower the pH to less than about 4.5 or a type which will render the mixture alkaline and introduce anions, the metal salts of which such as zinc are highly insoluble.

In one embodiment of the invention a mixture of sewage and four additives consisting of a bactericidal agent a solids coagulating agent, a filter aid an an adsorbent, is withdrawn from said holding zone in volumes exceeding the volume of influent sewage entering said holding zone, the withdrawn mixture is subjected to agitation and, if desired simultaneous comminution action to produce a mixture containing in suspension. particles resulting from comminution of solids exceeding a predetermined size a volume of the withdrawn resultant mixture equal to that of influent sewage is isolated and the balance of the resultant mixture is reintroduced into said holding zone in a manner creating agitation of the holding zone contents and the liquid portion of said isolated resultant mixture is separated from the solids associated therewith to produce disposable products.

In the preferred embodiment of the invention, the sewage is subjected to comminution action to produce a sewage containing coarse suspended particles and is held in a storage zone. A volume of the resultant comminuted sewage equal to that of the influent sewage is withdrawn and mixed with four additives consisting of a bactericidal agent, a solids coagulating agent, a filter aid and activated carbon and temporarily held in a second holding zone, a volume of the resultant mixture equal to that of the influent comminuted sewage is isolated and then the liquid portion of said isolated mixture is separated from the solids associated therewith.

The volume of sanitary waste produced on shipboard generally averages about 26 gallons per day per person. Typical wastes will contain about 800 mg./liter of suspended solids, and a coliform count of about $1 \times 10^9$/100ml. Biochemical Oxygen Demand (BOD) of such waste will average about 600mg./liter, with gallery wastes introducing into a treatment system materials exerting a BOD/day/person requirement about equal to the BOD/day/person introduced from toilets.

To eliminate at least 90% of the BOD remove at least 90% of the solids from effluent to be discharged overboard, and to reduce the coliform count to less than 240 MPN per 100 ml., requires the introduction of a plurality of treating agents if these results are to be accomplished in a minimum period in the range of 1 to 30 minutes so that the size of the equipment will be adaptable to various sizes of, for example, marine vessels. When using the plurality of treating agents, a longer period of treatment will accomplish improved treatment results using amounts within the ranges hereinafter specified and amounts greater than the ranges specified will accomplish improved results with the above specified minimum period range.

Wastewaters such as sewage contain dispersed solids that contribute to the BOD thereof. The dispersed materials are not readily filterable. While such materials may be coagulated by a flocculating additive, the aggregates of such materials are of a type that still present filter medium blinding effects. Sewages also contain some BOD materials which are not convertible to aggregates by the flocculating agent. This latter material can be removed from the aqueous mediums by adherence to the surface of adsorbents. The adsorbents can also function to adsorb the residues produced by the action of bacteria upon the suspended solids. Suspensions containing the materials above described contain so much slimy material and materials which compact into filter blinding layers, that rapid filtration, as a step necessary to cooperate with rapid treatment to remove BOD, eliminate bacteria, etc., is not possible. Addition of a filter aid introduce a finely divided insoluble material which does not compact and keep the aggregates from compacting and thus insures rapid filtration.

Flocculating agents useful in the instant invention are iron salts and aluminum salts such as alum, i.e., the double salts of sodium, potassium, or ammonium and aluminum sulfate, said salts being added in minimum quantities introducing an equivalent of the order of 20 mg./liter of aluminum and generally in quantities of the order of 20 to 400 mg./liter of aluminum, and iron salts such as ferric chloride and ferric sulfate in minimum quantities introducing an equivalent of the order of 40 mg./liter of iron and generally in quantities of the order of 40 to 800 mg./liter of iron.

Adsorbents, useful in the instant invention, to effect condensation on the surface thereof of materials not convertible to aggregates by flocculating agents, for example, activated carbon, clays such as Fuller's earth, bauxite and bentonite, and synthetic polymers such as styrene-divinyl benzene copolymers, weak base primary amine type resins, one of which is known to the trade as "Amberlite 1R-45," etc., may be introduced in either a powdered granular or bread form. The minimum quantity to be added is of the order of 50 mg./liter and generally in quantities in the range between about 100 and 1,000 mg./liter.

Bactericidal agent added may be in the form of halogen solutions, for example, aqueous sodium hypochlorite and sodium hypobromite solutions, or solids such as calcium hypochlorite, and organic chlorine compounds, such as hexachlorophenol, and sodium dichloroisocyanurate. Bactericidal agents are added in quantities such that the minimum quality added is an equivalent of 20 mg./liter of halogen, and generally in quantities in the range of about 20 to 600 mg./liter. If the bactericidal agent is gaseous chlorine, the minimum quantity to be dissolved in said waste-water-additives mixture is 20 mg./liter.

Filter aids useful in the instant process are particulate silicious materials such as diatomaceous silica, perlite, keiselguhr, etc. Filter aids are added in minimum quantities of the order of 200 mg./liter and generally in quantities in the range between 200 and 4,000 mg./liter of mixture.

Filter media, for example, viscose filter fabrics, which is effective for rapid filtration of the mixture of comminuted wastes and added agents require a pore size in the range between 1 and 25 microns and preferably in the range between 5 and 10 microns. Such media may be mounted on differential pressure type filters such as pressure filters having a fixed or rotary surface and intermittent or continuous vacuum filters of, for example, rotary drum type.

Additives may be added in various form and combinations, for example, suspensions produced by mixing additives with an aqeous medium which is not of a type requiring treatment, individual powders, granulated or pelletized combinations of additives. When additives are incorporated in a sewage, which generally will have a pH in the range of about 6 to 8, resultant mixtures containing the above specified four additives in the quantities specified will exhibit a pH in the range generally between about 4 and 7.

The lowering of the pH results from the presence of halogen containing compounds and aluminum and iron additives. If the nature of the wastewater is such that incorporation of the specified amounts of additives does not result in an acidic pH, for example in the preferred acidic range of 4 to 6, a pH in the range of 2 to 7 can be obtained by addition of an acid type of pH control agent such as sulfamic acid.

At pH's below neutrality the mixture tends to evolve halogen gas. To maintain effective bactericidal action, the liquid flow system thru which the mixture passes must be an airtight system to prevent escape of the halogen gases. It is preferred to maintain the airtight system under pressures in excess of atmospheric pressure because the greater liquid phase concentration of halogens accomplished thereby enhances the coliform reduction.

When the nature of the aqueous medium is such that it contains metallic cations, such as zinc, in soluble zinc salt form and in addition to the results accomplished by incorporation of the hereinbefore specified four additives, withdrawal of the zinc is desired, the precipitation of zinc in an insoluble salt form, can be accomplished by adjustment of the pH of the mixture to a pH of about 7 to 10.0 and preferably 8 to 9.5 with a pH control agent of an alkaline type in the form of an alkali metal salt, such as sodium carbonate, potassium carbonate, sodium hydroxide, potassium hydroxide and sodium sulfide in quantities to create a mixture having a pH in the specified range and provide a stoichiometric equivalent amount of an anion which will form an insoluble zinc salt such as zinc carbonate. In view of the operability under both acidic and alkaline pH conditions, the overall pH range for operation in accordance with the instant invention is 2 to 10.

Briefly, the apparatus for carrying out the process described for treating aqueous mediums contaminated with organic and/or inorganic impurities comprises a contaminated aqueous medium receiving tank, inlet means for receiving said aqueous medium, comminution means having liquid inlet passage means communicating with the interior of said receiving tank and outlet passage means to return resultant liquid suspension to said receiving tank, means for introducing additives to be mixed with said resultant liquid suspension individually or in combinations, means for effecting mixing of all of said additives and said resultant liquid suspension to produce a resultant mixture, means for effecting separation of said resultant mixture into two components, one component of which is a concentrate of solids and the other a substantially solids free aqueous medium, means interconnecting said means for effecting mixing and said means for effecting separation, and means for discharging substantially solids free aqueous medium from said means for effecting separation.

The apparatus for carrying out a preferred embodiment of the invention comprises a wastewater receiving tank, inlet means for receiving said wastewater, comminution means having liquid inlet passage means communicating with said receiving tank and outlet passage means to return resultant liquid suspension to said receiving tank, slurry tank means, means for introducing liquid and additives into said slurry tank means, means communicating with said outlet passage means for effecting mixing of additives and resultant liquid suspension to produce a resultant suspension mixture, piping means for transfer of slurry of additives from said slurry tank means into said means for mixing additives and resultant liquid suspension, means establishing communication between said means for mixing additives with resultant liquid suspension and said means for separating said resultant mixture into two components, consisting of liquid and airtight piping means for transfer of said resultant mixture.

The invention will be further understood from the following description of four embodiments of the invention taken in conjunction with the following drawings in which.

Figure 1:
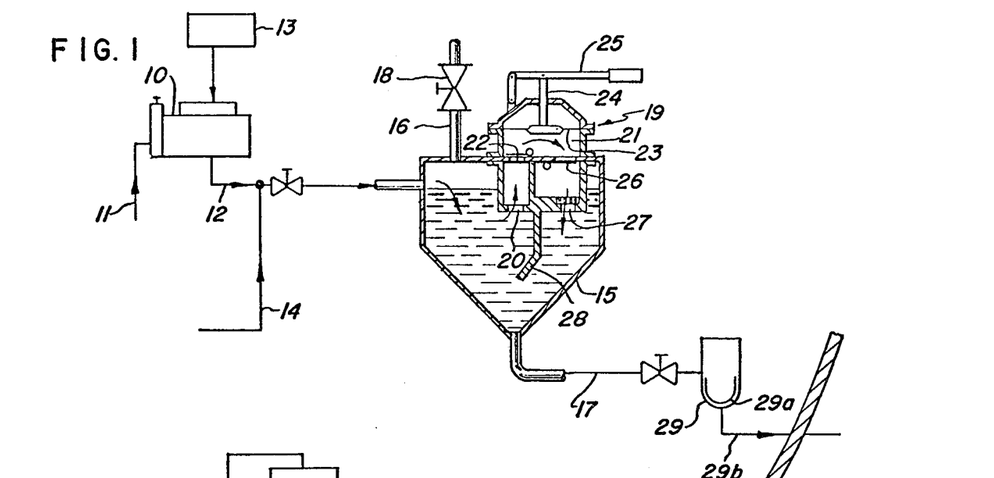
FIG. 1 is a schematic diagram of one embodiment of the present invention involving a comminuter unit positioned within the holding tank for the wastewater mixture.

Referring to FIG. 1, the numeral 10 indicates a conventional marine toilet into which water is introduced through inlet pipe 11 to flush the contents of the toilet out thru outlet pipe 12. Additives are added to the waste in the toilet at the time of each flushing in the form of separate water soluble or disintegratable packages with contents predominated by quantities of, for example, calcium hypochlorite, and activated carbon powder discharged from package dispensers 13. The packages may contain distomaceous earth filter aid and/or potassium-aluminum sulfate or the latter additives may also be introduced as separate package materials. Outlet pipe 12 also has communicating therewith a galley waste conduit 14. Outlet pipe 12 delivers waste material plus the introduced additives to holding tank 15. Holding tank 15 is provided with a pair of pipes 16 and 17 communicating with the interior thereof. Pipe 16 communicates with the atmosphere thru control valve means 18. Mounted within the tank 15 is a manually actuated pump 19. Pump 19 has an inlet 20 for admission of mixture from holding tank 15 which communicates with an internal chamber 21 thru a check valve 22. A flexible diaphragm 23 for exerting pressures to mixture in chamber 21 is actuated by a rod 24 pivotably connected to an actuating arm 25. Mixture is discharged from chamber 21 thru a spring actuated check valve 26 and outlet 27, flow from which is prevented access to the inlet 20 by a baffle 28. Soft sewage solids of particle size greater than a predetermined size are subjected to coarse disintegration as they pass thru the check valves 22 and 26. The rasultant mixture being returned to the holding tank 15 thru the pump outlet 27 is discharged with a velocity creating agitation of the holding tank contents.

Figure 3:
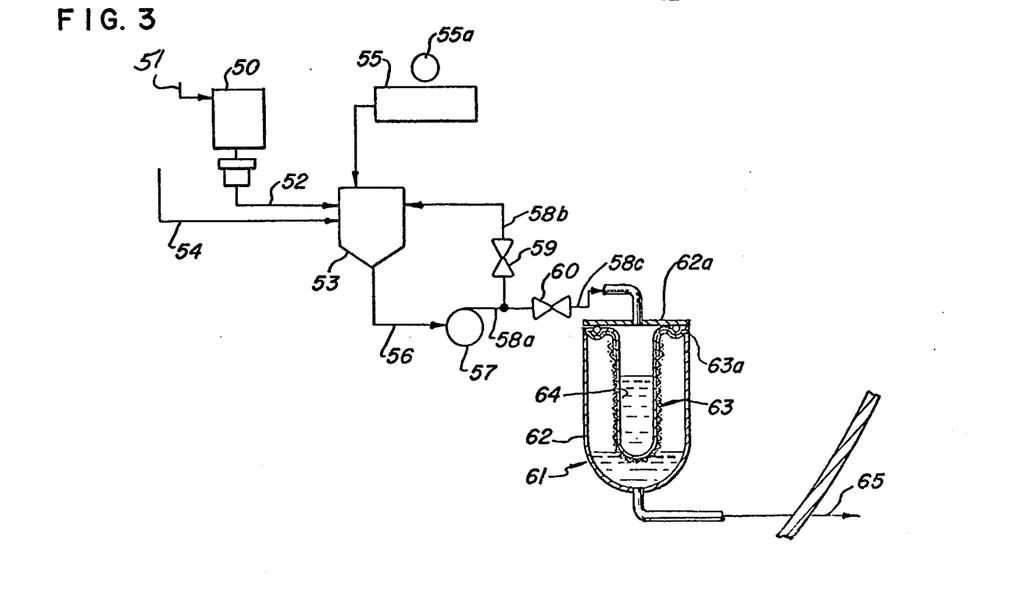
FIG. 3 is a schematic diagram of a third embodiment of the invention having the apparatus subject to automatic control.

Pipe 17 connects with a filter tank 29, preferably of the type where influent material flows into the interior of a sack type filter medium supported in a position above a clarified liquid accumulation zone 29a of tank 29, one type of which is described in detail in conjunction with FIG. 3. Liquid accumulated in zone 29a is then discharged to waste through outlet pipe 29b.

Figure 2:
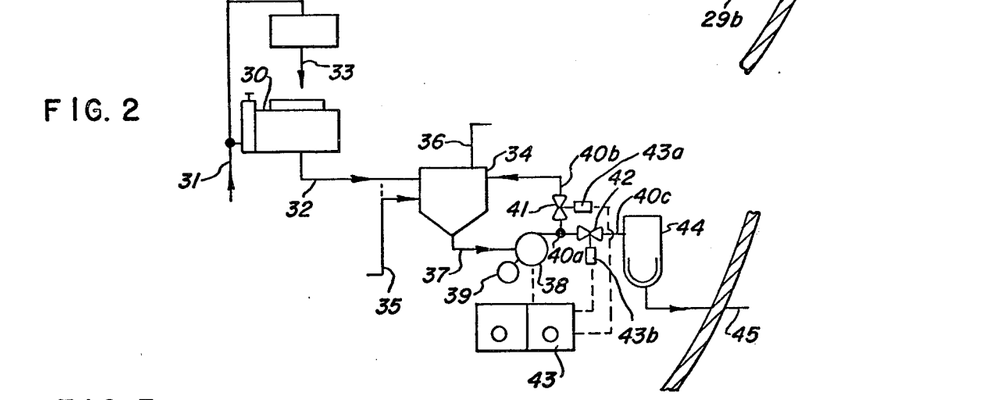
FIG. 2 is a schematic diagram of the second embodiment wherein recirculation of mixture is thru a pump positioned outside said holding tank for the wastewater mixture.

Referring to FIG. 2, the numeral 30 indicates a conventional toilet into which water is introduced through pipe 31 to flush the contents of the toilet out through pipe 32. Additives may be added to the waste in the toilet by suitable means 33 at the time of each flushing, by such systems as metering in of solutions of individual additives or of mixtures of any number of the additives, by dissolution of additives from a column disposed in the influent water line upstream of the toilet such that the water runs through the column when the toilet is flushed, by discharge of solids in amounts created by a movable actuator responsive to the flushing of the toilet.

Pipe 32 delivers toilet waste material to a holding tank 34. Galley waste enters the system through a conduit 35 which as indicated by broken lines communicates with pipe 32 or is connected directly with holding tank 34.

Holding tank 34 is vented to the atmosphere through a pipe 36 connected with the top thereof. Holding tank 34 is provided with an outlet pipe 37 which connects to the inlet of a positive displacement pump 38 driven by a motor 39. The outlet of pump 38 is connected through a pipe 40a which communicates in a T-joint, with pipes 40b and 40c. Valves 41 and 42 are intended for independent operation, for example, means 43 for energizing the systems for actuation of pump 38 and solenoids 43a and 43b by which solenoids in turn actuate valves 41 and 42, respectfully, so that the resultant mixture discharged by pump 38 can be recirculated through pipe 40b to holding tank 34 or directed to the filter 44, one type of which is described in detail in conjunction with FIG. 3. Clarified liquor separated from the mixture is discharged from the filter 44 through effluent discharge pipe 45. When the resultant mixture is being recirculated, the filter containers and accumulated solids may be withdrawn and replaced with fresh filter mediums.

Referring to FIG. 3, the numeral 50 indicates a conventional toilet into which water is introduced through pipe 51 to flush the contents of the toilet out through pipe 52. Pipe 52 delivers toilet waste material to a holding tank 53. Galley waste is delivered to holding tank 53 through pipe 54. Chemical additives are introduced into holding tank 53 by a combination of suitable dispensers 55 actuated by drives from a motor 55a.

Holding tank 53 is provided with an outlet pipe 56 which connects to the inlet to a pump 57. The outlet of pump 57 is connected through a pipe 58a which communicates in a T-joint, with pipes 58b and 58c. Pipes 58b and 58c have valves 59 and 60 interposed in the respective pipes. Liquid mixture passing through the pump 57 is recirculated through pipe 58a and 58b to holding tank 53 when valve 59 is open and valve 60 is closed. When the valve 60 is open the resultant mixture is discharged to a filter 61. Filter 61 is preferably of the type consisting of a pressure vessel shell 62 closable by a cover 62a which has a restrainer basket 63 suspended therein from a flange 63a and contains a filter bag 64 equipped with a snap ring attachment for securing to the restrainer basket. Clarified liquid separated from the associated solids is discharged from the filter 61 through effluent outlet pipe 65. Filter bag 64 and solids accumulated therein are removed therefrom by manual or mechanical means and transferred by, for example, a moving belt to an incinerator.

Figure 4:
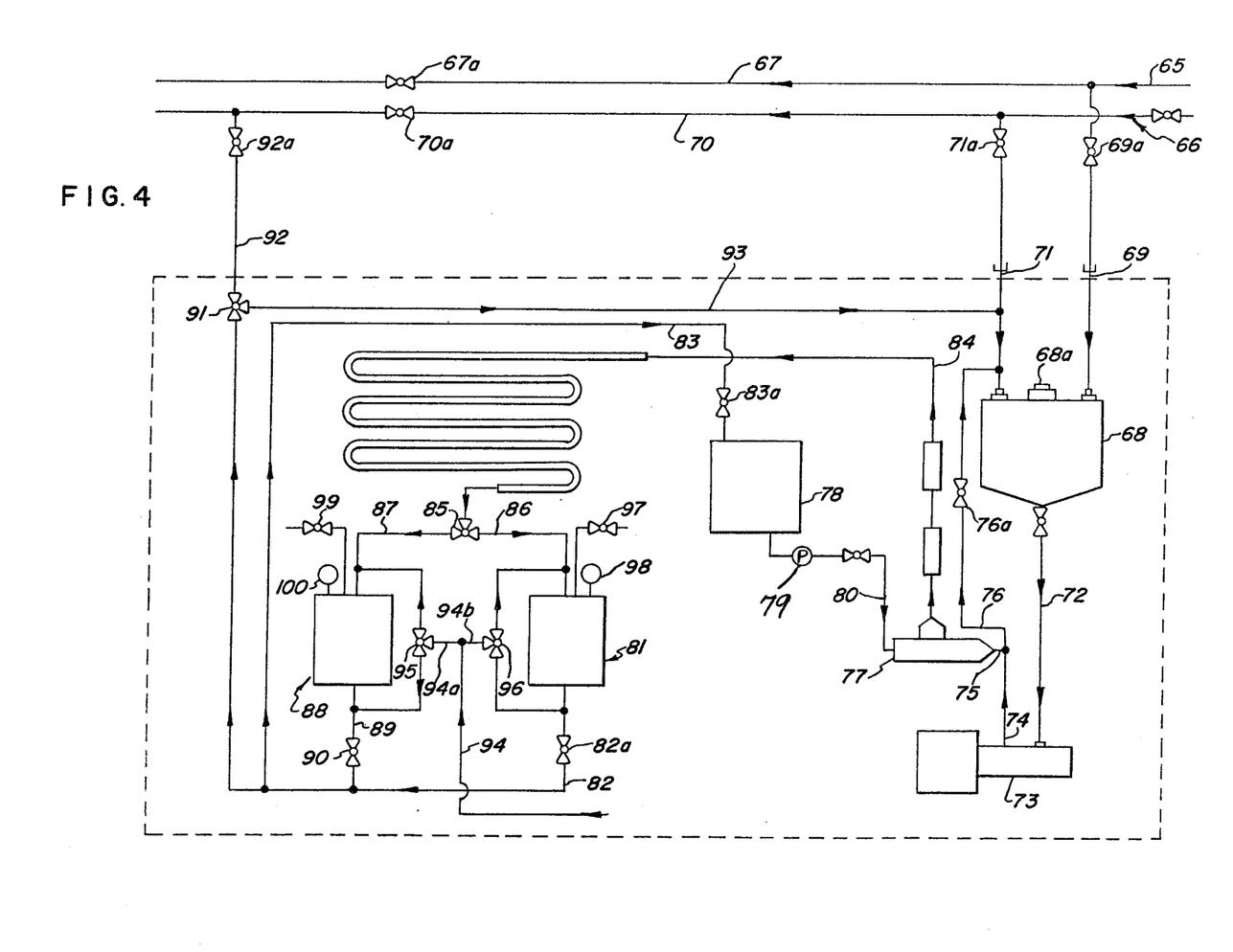
FIG. 4 is a schematic illustration of the preferred embodiment, wherein recirculated sewage is mixed with an aqueous suspension of additives.

Referring to FIG. 4, illustrating a preferred embodiment of the invention, the numeral 65 indicates a pipeline for delivery of sewage from a conventional toilet. The numeral 66 indicates a pipeline for conveyance of galley waste. Sewage may be discharged overboard thru pipe 67, flow thru which is controlled by valve 67a, or delivered to surge tank 68 thru pipe 69, flow thru which is controlled by valve 69a. Galley waste may be discharged overboard thru pipe 70, flow thru which is controlled by valve 70a or delivered to surge tank 68 thru pipe 71, flow thru which is controlled by valve 71a. Waste material is removed from tank 68 in volumes equal to influent flow thru outlet pipe 72 which connects to the inlet to a pump 73, the pump being manually energized or energized by a liquid level controller 68a mounted within tank 68, which controller will energize the pumps when liquid level exceeds 10 inches.

The outlet of pump 73 is connected thru pipe 74 which communicates in a T-joint with branch pipes 75 and 76. Pipe 76 has a valve 76a associated with said pipe. Waste material consisting of sewage and galley waste passing thru the pump 73 which may be a conventional positive displacement type or a maccrating pump is recirculated thru pipes 74 and 76 to holding tank 68 when valve 76a is open. When valve 76a is only partially open, a portion of the waste material having a contents of a particle size resulting from passage thru said pump 73 which effects coarse disintegration of any solids exceeding a predetermined size, is introduced into mixing chamber 77, where it is mixed with a slurry of additives delivered from slurry tank 78 by pump 79 thru pipe 80. Pump 73, like pump 79, is subject to energizing by liquid level controller 68a and will proportion chemical slurry delivered into mixing chamber 77. An aqueous slurry of additives is formed in slurry tank 78 by mixing the additives with aqueous medium returned from a pressure filter 81 thru pipe 82 having a valve 82a associated therewith and pipe 83. Effluent recycle to slurry tank 78 is controlled by valve 83a. The mixture of waste material and additives formed in mixing chamber 77 is discharged thru pipe 84, valve 85 and branch pipes 86 and 87 into pressure filters 81 and 88 respectfully.

Pressure filter 88 communicates thru outlet pipe 89, and valve 90 with pipe 82 which pipe in turn transfers any desired portion of the effluent thru three way valve 91, pipe 92 and valve 92a to overboard discharge line 70. Valve 91 also may direct part of the effluent thru pipe 93 which communicates with pipe 71 for recycle of effluent to surge tank 68.

Branch pipes 86 and 87 and filter outlet pipes 82 and 89 each has air conduits communicating therewith. Air under pressure is introduced thru pipe 94 and branch pipes 94a and 94b which branch pipes communicate with three way valves 95 and 96.

When back pressure in pressure filter 81 reaches 80 to 90 psig, valve 85 shunts flow of the mixture to pressure filter 88. When delivery of mixture to pressure filter 81 is arrested, valve 96 is opened to blow air thru the top of filter 81. After blowing to force water out of the accumulated solids, valve 82a is closed and the valve 96 is reversed to pass air thru the bottom of filter 81. Opening and shutting of air bleed valve 97 when pressure gage 98 reads, for example, 90 psig, effects loosening of the filter cake from the filter medium so that the solids are readily removable from filter 81.

When filter 81 is emptied and ready to process additional mixture, valve 85 shuts off flow of mixture to pressure filter 88. At such times, the valve 95 is opened to blow air thru the top of filter 88. After water is forced out of the accumulated solids, valve 90 is closed and valve 95 is reversed to pass air thru the bottom of filter 88. Opening and shutting of air bleed valve 99 when pressure gage 100 reads, for example, 90 psig, effects loosening of the filter cake from the filter medium so that the solids are readily removable.

Figures 5, 6:
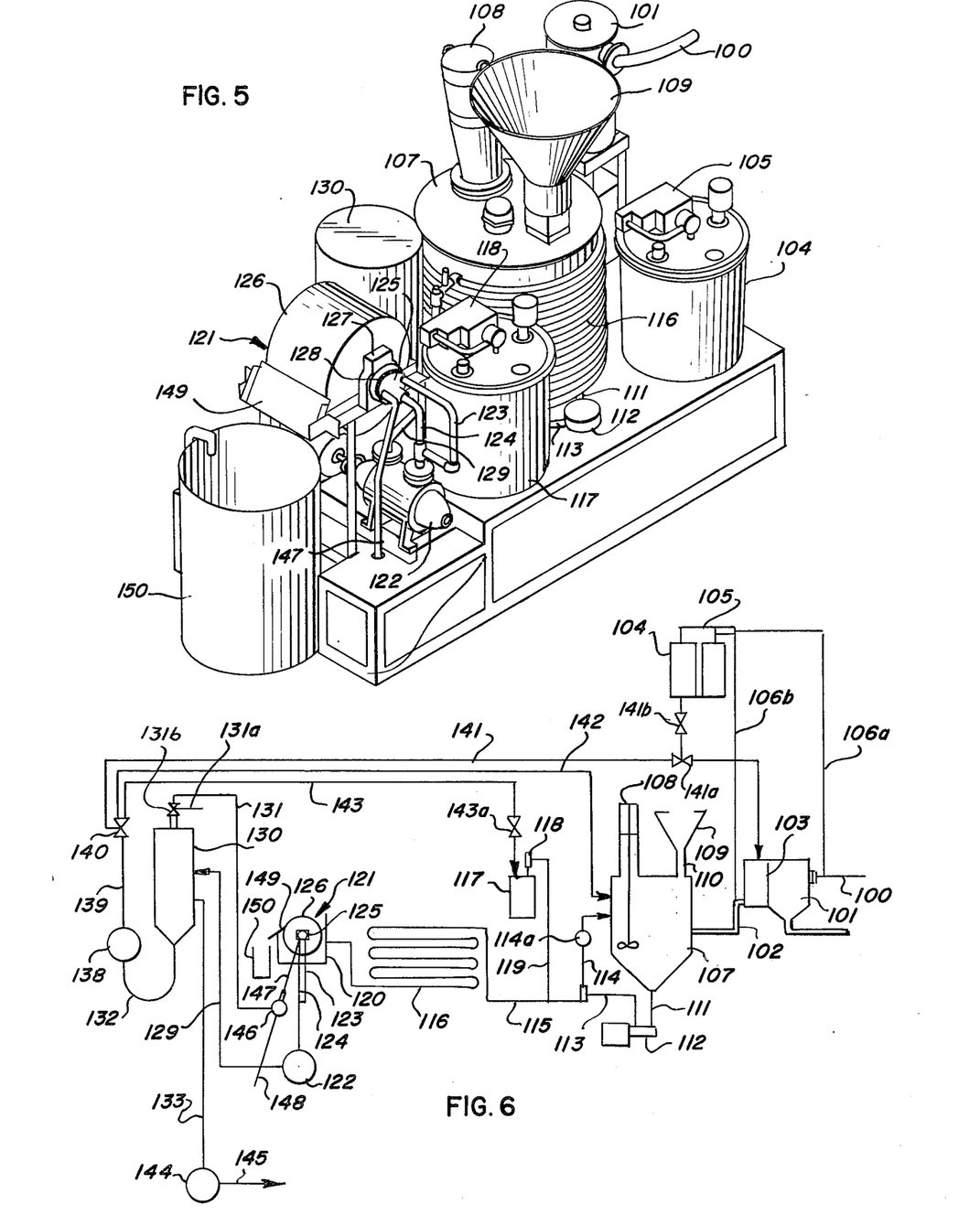
FIG. 5 is a perspective view of apparatus illustrating a modified form of the preferred embodiment of the invention shown in FIG. 4.
FIG. 6 is a schematic illustration showing the flow arrangement of the embodiment of FIG. 5.

Referring to FIGS. 5 and 6, the numeral 100 indicates a pipeline for delivery of a waste material for example, sewage from a conventional toilet to the treatment system. Pipeline 100, depending upon the source of the waste material, may or may not connect to a chamber 101 provided with vertical screening means 103 designed to effect interception and straining out of solids and semi solids of a physical character and of a size too large to pass thru a macerator. If the screening tank 101 is present, aqueous halogen containing solution produced in tank 101 is removed therefrom by pump 105 which discharges the solution thru outlet pipe 106a or 106b. The outlet pipes communicate respectively with pipeline 100 or pipe 102 depending upon the presence or absence of a screening chamber 101, for mixing halogen containing solution with the waste material being delivered to the surge tank 107.

Solids are maintained in suspension in the surge tank 107 by the agitation action of mixer 108 which has the shaft thereof extending downwardly thru the top of surge tank 107. Also mounted on the top of surge tank 107 is a hopper 109 havng a piping connection 110 communicating with the interior of surge tank 107 for introduction of solid additives thereto. The mixture produced in surge tank 107 is removed therefrom thru outlet pipe 111 which connects to the inlet of a macerator pump 112. The outlet of the pump 112 is connected thru pipe 113 which communicates in a T-joint with branch pipes 114 and 115. Pipe 114 has a valve 114a associated with said pipe. Suspension consisting of waste material plus additives passing thru the pump 112 which may be a conventional positive displacement type or a macerating pump, is recirculated thru pipe 113 and 114 to surge tank 107 when valve 114a is open. When valve 114a is only partially open, a portion of the suspension is passed thru pipe 115 which communicates with pipe coil 116. Aqueous alum solution is produced in tank 117. Alum solution is removed therefrom by pump 118 which discharges the solution thru outlet pipe 119 that communicates with pipe 115.

The mixture of waste material and additives is delivered by pipe coil 116 to the filter vat 120 of vacuum filter unit 121. Vacuum filter unit 121 has a vacuum pump 122 communicating therewith. Pump 122 is provided with pipes 123 and 124 which communicate with an automatic valve box 125 for directing communication with the interior parts of rotary filter drum 126, for effecting filtering, dewatering and drying cycles. Valve box 125 is mounted on a housing 127 for the trunnion of filter drum 126 and separated therefrom by a wearing plate 128.

Liquid and air withdrawn by the wet type vacuum pump 122 is delivered thru pipe 129 to cylindrical tank 130. The incoming filtrate and air separate in tank 130. Air is withdrawn thru the outlet duct 131 or discharged thru vent 131a, with flow being controlled by valve 131b. Separated filtrate is drained away thru a piping connection 132 at the bottom thereof and an outlet pipe 133 communicating with an area elevationally displaced from the tank bottom. Piping connection 132 communicates with pump 138. Pump 138 discharges effluent thru outlet pipe 139 to three way valve 140 which transfers any desired portion of the filtrate to recycle pipes 141, 142 and 143. Pipe 141 having valves 141a and 141b associated therewith effects transfer of recycle filtrate to tank 104 for formation of an aqueous halogen containing solution and to chamber 101 for flushing of the solids from the screening means. Pipe 142 effects transfer of filtrate to surge tank 107. Pipe 143 having valve 143a associated therewith effects transfer of filtrate to tank 117.

Outlet pipe 133 communicates with pump 144 which discharges the filtrate to waste thru pipe 145.

Air withdrawn from tank 130 thru outlet duct 131 by pump 146, is introduced under pressure into the interior of drum filter 126 thru pipe 147 to loosen solids accumulated on the exterior surface thereof. Alternatively, air to be introduced thru pipe 147 may be received thru pipe 148 from an ambient source of air. Loosened solids are removed from the drum by scraper blade 149 and accumulated in receiver tank 150.

The invention will be further illustrated by the following examples which are given without any intention that the invention by limited thereto.

EXAMPLE I

Sewage to be treated in accordance with the invention as illustrated in FIG. 4 at a design rate of approximately 5 gallons of raw sewage per minute, is accumulated in the surge tank of approximately 250 liquid gallon capacity, i.e., a diameter of approximately 3 foot and a height of 5 feet. When accumulated sewage exceeds a depth of 20 inches, the tank contents are moved thru the pump 73 and the macerated sewage is returned to the surge tank. When valve 85 is opened, macerated sewage is delivered to the mixing zone at a rate of 5 gallons per minute and conveyed from the mixing zone to the filter presses thru 120 foot of 1 ¼inch ID. piping.

In the surge tank, 219 gallons of macerated sewage have mixed therewith, 1312 grams of "Cellite 501," 372 grams of "Darco S51" activated carbon, and 360 grams of calcium hypochlorite. After a few minutes of mixing the halogen containing mixture, approximately 49 grams of alum was added and the total mixture introduced into the piping leading to the filters.

When a macerated sewage having a suspended solids content of 695 mg./liter and a volatile suspended solids content of 625 mg./liter, a pH of about 8.3, a total organic carbon content of 272 mg./liter, a soluble organic carbon (SOC) content of 85 mg./liter, a biochemical oxygen demand (BOD) of 450 mg./liter, a total phosphorus (P) content of 32 mg./liter and a total nitrogen (N) content of 60 mg./liter, and a coliform count of 27 $\times 10^8$ units/100 ml., is provided with a holding period of 11 minutes for the mixture containing chlorine and 5 minutes for the complete mixture, an effluent is obtained having only a trace of suspended solids, only a trace of volatile suspended solids, a pH of 5.7, a TOC of 47, a BOD of 55, a total phosphorus content of 1 mg./liter and a coliform count of less than 3/100ml.

When a holding period 19 minutes is provided for the mixture containing chlorine, an effluent is obtained having only a trace of suspended solids, a pH of 5.45, a TOC of 44 mg./liter and a BOD of 51 mg./liter, and a coliform count of less than 3/100ml.

The filter cake removed from the filter containing a 2:1 filter aid to solids concentration which had a maximum chlorine contact time of 25 minutes had $5 \times 10^4$ coliform units per gram of solids.

When the filter aid quantity was increased to 2623 grams so as to increase the ratio of filter aid to solids to 4:1 and the cake was removed from the filters after providing a total chlorine contact time of 70 minutes, the filter cake had a coliform count of less than 3 units per gram.

EXAMPLE II

When contaminated water, such as river water or a type similar thereto is treated in accordance with the instant invention for example as set forth in FIG. 6, at a design rate of 7 gallons per minute, the contaminated water is accumulated in the surge tank.

As the contaminated water is accumulated in the surge tank, soild additives are introduced thru hopper 109. In the surge tank, 250 gallons of contaminated water have mixed therewith 1510 grams of "Cellite 501" filter aid, 283 grams of "Darco S51" powdered activated carbon and 50 grams of calcium hypochlorite.

When the accumulated water attains a volume of approximately 250 gallons, the surge tank contents are moved thru the pump 112 and then returned to the surge tank. When the valve 114a is partially closed, liquid suspension is moved thru 120 feet of 2 inch ID. piping at a rate of 7 gallons per minute.

As the suspension is moved thru the piping, a solution containing alum is mixed therewith to incorporate 630 grams of alum per 250 gallons of water. The complete mixture is provided with a holding time of approximately 5 minutes as it passes to the filter.

Upon filtration of the suspension thru a filter having a 10 micron average pore size, the effluent is a sparkling clear water.

EXAMPLE III

A wastewater to be treated in accordance with the invention as illustrated in FIG. 6 at a design rate in the range of approximately 4 to 6 gallons of raw sewage per minute, is accumulated in the surge tank of approximately 70 to 200 liquid gallons capacity. When a predetermined amount of sewage flows to the surge tank, a calcium hypochlorite solution is injected through lines 106a or 106b into the sewage at a rate equivalent to 1.5 grams of chlorine per gallon of sewage and other additives are introduced into the surge tank through the hopper 109. The additives per gallon of sewage are 6 grams of "Cellite 501" filter aid and 1.7 grams of "Nuchar KD" activated carbon. The additives are dispersed and held in suspension by means of mixer 108.

When the accumulated sewage attains a volume exceeding 15% of tank capacity, the surge tank contents having a pH of about 7 is moved through pump 112 and then returned to the sewage surge tank. When valve 114a is partially closed, liquid suspension is transferred to pipe coil 116, a solution containing alum and sulfamic acid is mixed therewith to incorporate 2 grams of alum and 1.1 grams of sulfamic acid per gallon of combined sewage. The complete mixture having a pH of approximately 4 is provided with a holding time of 3 to 5 minutes by being moved through approximately 160 feet of 2 inch ID. piping at a rate of between 4 to 6 gallons per minute. Solids are removed by rotary-vacuum filter unit 121 with a 10 square foot filter area.

The effluent obtained has a bout 40 mg./liter of suspended solids, a pH of about 4, a TOC of about 70 mg./liter, a BOD of about 40 mg./liter, a coliform count of less than 3 per 100ml.

EXAMPLE IV

A wastewater to be treated in accordance with the invention as illustrated in FIG. 6, such as has been accumulated from toilet systems using recirculated water containing about 13 grams of zinc sulfate per gallon of recirculated water as a bacteriostatic agent, at a design rate of approximately 0.5 to 1 gallon of sewage per minute, is accumulated in a surge tank of approximately 70 gallon capacity.

When a predetermined amount of combined sewage flows to the surge tank, a calcium hypochlorite solution is injected through lines 106a or 106b into the sewage at a rate equivalent to 13 grams of chlorine per gallon of sewage, effluent as dilution water is injected through lines 142, and other additives are introduced into the surge tank through the hopper 109. The dilution water is 7 gallons per gallon of combined sewage and the additives per gallon of combined sewage are 62 grams of "Cellite 501" filter aid, 14 grams of "Nuchar KD" activated carbon, and 144 grams sodium carbonate. The additives are dispersed and held in suspension by means of mixer 108.

When the accumulated sewage attains a volume exceeding 15% of tank capacity, the surge tank contents having a pH of about 9.5 is moved through pump 112, and then returned to the surge tank. When valve 114a is partially closed, liquid suspension is transferred to pipe coil 116, a solution containing alum is mixed therewith to incorporate 16 grams of alum per gallon of combined sewage. The complete mixture is provided with a holding time of 3 of 5 minutes by being moved through approximately 160 feet of 2 inch ID. piping at a rate of between 4 to 6 gallons per minute. Solids are removed by rotary vacuum-filter unit 121 with a 10 square foot filter area.

The effluent obtained has about 60 mg./liter of suspended solids, has a pH of about 9, a TOC of about 100 mg./liter a BOD of about 60 mg./liter, a coliform count of less than 3 per 100ml., and less than 1 mg./liter of zinc.

We claim:

1. A process for treatment of sewage and rapidly producing a disposable mass of solids and a hygenic effluent of relatively low BOD, low suspended solids, and low phosphorus content which comprises the steps of (1) establishing a mixture of sewage with four additives, said sewage having solids present therein of a particle size resulting from flow through a zone adapted to effect coarse disintegration of any solids exceeding a predetermined size, said additives being a bactericidal agent, a colloidal solids coagulating agent, a filter aid and an adsorbent, (2) passing the mixture through a liquid and airtight flow system without permitting any of the solids therein to settle to effect an intimate mixing of the additives and said sewage and to maintain an unsettled mixture of aqueous medium and suspended solids and then (3) passing the unsettled mixture through a differential pressure type filter unit to separate the solids from the liquid portion of said mixture to produce a substantially solids free effluent.

2. A process according to claim 1 including the steps of accumulating said sewage in a holding zone, circulating said sewage from said holding zone through said zone adapted to effect coarse disintegration of solids exceeding a predetermined size, and back to said holding zone and mixing said suspension of additives with said sewage containing solids disintegrated so as not to exceed a predetermined size in the first portion of said liquid and airtight system.

3. A process according to claim 2, wherein the average time preferred for treatment of sewage is in the range between about 1 and about 30 minutes.

4. A process according to claim 2, wherein the sewage emanates from marine toilets and marine holding tanks.

5. A process according to claim 1 wherein said sewage is accumulated in a holding zone, said additives are mixed with said sewage in said holding zone to form a mixture, and then said mixture is recirculated between the holding zone and a zone adapted to effect coarse disintegration of any solids exceeding a predetermined size at flow rates creating agitation whereby the contents of said holding zone are maintained in suspension.

6. A process according to claim 5 wherein said holding zone is a liquid and airtight zone, circulation of said mixture to disintegrate solids is from said holding zone to an isolated zone positioned within said holding zone adapted to effect coarse disintegration of solids by manual operation, effecting movement of a portion of said mixture in said holding zone thru said liquid and airtight liquid flow system and then thereafter filtering off the liquid portion of said mixture.

7. A process according to claim 5, wherein said four additives are present in predetermined amounts in a package, said amounts providing required quantities of additives for processing the amount of sewage discharged at each flushing of marine toilets and each package is carried to said holding zone where disintegration of said package permits distribution of said additives in said sewage accumulation zone.

8. A process according to claim 5, wherein said bactericidal agent is incorporated as a first additive and a granular solid mixture of filter aid, activated carbon and flocculating agent is subsequently added to produce said mixture prior to passage thru said airtight liquid flow system.

9. A process according to claim 1 wherein the bactericidal agent is a halogen-containing chemical and the minimum quantity added is an equivalent of 20 mg./liter of halogen.

10. A process according to claim 1 wherein the bactericidal agent is gaseous chlorine and the minimum quantity dissolved in said mixture is 20 mg.liter.

11. A process according to claim 1 wherein the filter aid is solid particulate diatomaceous earth and the minimum quantity added is of the order of 200 mg./liter of mixture.

12. A process according to claim 1 wherein the adsorbent is selected from the group consisting of activated carbon, Fuller's earth, bauxite, synthetic polymers and the minimum quantity thereof the order of 50 mg./liter.

13. A process according to claim 1 wherein the colloidal solids coagulating agent is selected from the group consisting of aluminum salts and ferric salts, said salts being added in minimum quantities equivalent of the order of 20 mg./liter of aluminum and the equivalent of the order of 40 mg./liter of iron.

14. A process according to claim 13 wherein the colloidal solids coagulating agent added in alum.

15. A process according to claim 13 wherein the colloidal solids coagulating agent added is selected from the group consisting of the double salts of sodium, potassium, ammonium, and aluminum sulfate.

16. A process according to claim 1 wherein a fifth additive in the form of a pH control agent is added to create a mixture with a pH in the range of 2 to 10.

17. A process according to claim 16 wherein said pH control agent is an acid incorporated to create a mixture having a pH in the range of 2 to 7.

18. A process according to claim 17 wherein said fifth additive is sulfamic acid.

19. A process according to claim 16 wherein said pH control agent in the form of an alkali metal salt, is incorporated to create a mixture having a pH in the range of 7 to 10.

20. A process according to claim 19 wherein the sewage to be treated contains soluble zinc salts and said added alkali metal salt introduces a stoichiometric equivalent amount of an anion which will form an insoluble zinc precipitate.

21. A process according to claim 1 wherein filtering off the liquid medium of said suspension from associated solids is accomplished by passage thru a filter medium having a pore size in the range between 1 and 25 microns.

22. A process according to claim 1 wherein said mixture of sewage and additives has a pH in the range between 2 and 8, and the liquid and airtight liquid flow system is maintained under superatmospheric pressure whereby effectiveness of the combined additives is enhanced.

23. A process for treatment of sewage for rapidly producing therefrom a disposable mass of solids and a hygenic effluent of relatively low BOD and low suspended solids, which process comprises the steps of comminuting said sewage to effect coarse disintegration of any solids exceeding a predetermined size; directing said sewage to a holding zone; supplying additives comprising a colloidal solids coagulating agent, a filter aid, a bacteriocidal agent, and an adsorbent to said sewage and thoroughly mixing said additives with said sewage to form a mixture in said holding zone, the minimum quantity of filter aid added being in the order of 200 mg./liter of sewage and the minimum quantity of adsorbent added being in the order of 50 mg./liter of sewage; moving said mixture directly from said holding zone through a flow system without permitting any of the solids therein to settle and to maintain an unsettled mixture of aqueous medium and suspended solids; and passing the unsettled mixture directly from said flow system through a differential pressure type filter unit to separate the solids from the aqueous medium portion of the mixture to produce said hygenic effluent and said disposable mass of solids.

24. A process for treatment of sewage according to claim 23 including the step of driving air through said separated solids in said filter unit to dewater the solids.

25. A process for treatment of sewage according to claim 23 wherein the pH of said mixture is maintained below 7.

26. A process for treatment of sewage according to claim 25 wherein the pH of said mixture is maintained in the range from about 4 to about 6.

* * * * *